United States Patent
Robinson et al.

(10) Patent No.: US 10,800,466 B2
(45) Date of Patent: Oct. 13, 2020

(54) DUAL MOTION TAILGATE USING A CONFIGURABLE MECHANICAL LINKAGE

(71) Applicant: Rivian IP Holdings, LLC, Plymouth, MI (US)

(72) Inventors: William Kirk Robinson, Ann Arbor, MI (US); Sheetanshu Tyagi, Ann Arbor, MI (US)

(73) Assignee: Rivian IP Holdings, LLC, Plymouth, MI (US)

( * ) Notice: Subject to any disclaimer, the term of this patent is extended or adjusted under 35 U.S.C. 154(b) by 94 days.

(21) Appl. No.: 16/190,120

(22) Filed: Nov. 13, 2018

(65) Prior Publication Data
US 2020/0148282 A1    May 14, 2020

(51) Int. Cl.
*B62D 33/03* (2006.01)
*B62D 33/027* (2006.01)

(52) U.S. Cl.
CPC ......... *B62D 33/0273* (2013.01); *B62D 33/03* (2013.01); *E05Y 2900/544* (2013.01)

(58) Field of Classification Search
CPC ............ B62D 33/0273; B62D 33/0276; B62D 33/03; B62D 33/037
USPC .................................................. 296/51, 57.1
See application file for complete search history.

(56) References Cited

U.S. PATENT DOCUMENTS

| | | | |
|---|---|---|---|
| 4,818,009 A * | 4/1989 | Muscat | B60J 5/106 296/106 |
| 6,712,418 B1 | 3/2004 | Lathers | |
| 6,893,203 B2 | 5/2005 | Anderson et al. | |
| 7,111,884 B2 | 9/2006 | Johnson | |
| 9,862,429 B2 * | 1/2018 | Castillo | B62D 33/0273 |
| 10,569,812 B2 * | 2/2020 | Tyagi | B62D 33/03 |
| 2004/0183326 A1 | 9/2004 | Tegtmeier | |
| 2006/0125270 A1 | 6/2006 | Madlinger | |
| 2007/0075560 A1 * | 4/2007 | Katterloher | B60R 3/02 296/50 |
| 2008/0191507 A1 | 8/2008 | Farber | |
| 2017/0291551 A1 | 10/2017 | Krajenke et al. | |
| 2019/0185074 A1 | 6/2019 | Morley et al. | |

OTHER PUBLICATIONS

Dual Action Tailgate. 2018 Honda Ridgeline. Available online at http://owners.honda.com/vehicles/information/2018/Ridgeline/features/Dual-Action-Tailgate/2, 2 pages.

(Continued)

*Primary Examiner* — Jason S Morrow
(74) *Attorney, Agent, or Firm* — Haley Guiliano LLP

(57) ABSTRACT

A dual motion tailgate is configured to undergo two distinct motions, each with advantages depending on circumstances. The tailgate can undergo a rotation (i.e., drop) motion as well as a swing down motion via one or more linkages and corresponding latches. The swing down motion allows closer access to the bed, and the tailgate extends less far from the rear of the vehicle as compared to the drop motion. Latches constrain one or more motions of the tailgate, allowing a desired motion of the tailgate. The motions may be manually controlled, or actuator controlled. When automatically controlled, a control system manages one or more latches and actuators to allow a desired motion of the tailgate.

19 Claims, 9 Drawing Sheets

(56) References Cited

OTHER PUBLICATIONS

Screen shot (at 0:22 seconds) from Suzuki X-HEAD concept car at Tokyo Motor Show 2007. Available online at https://youtu.be/A-6A4ZvVhpk, 1 page.
2008 Honda Ridgeline Brochure. Available online at http://wwww.auto-brochures.com/makes/Honda/Ridgeline/Honda US%20Ridgeline 2008.pdf, 14 pages.

\* cited by examiner

DUAL MOTION TAILGATE USING A CONFIGURABLE MECHANICAL LINKAGE

The present disclosure is directed toward an improved tailgate assembly that may undergo more than one motion.

BACKGROUND

Vehicle tailgates typically open using a single trajectory to allow access to the rear cargo area. Tailgates that undergo more than one motion typically require separate mechanisms for each motion. For example, a truck tailgate typically drops down by rotating about a hinge to allow access to the truck bed. The dropped tailgate allows a user to increase horizontal work space, storage space, or provide a platform for climbing into the bed. One drawback to this motion is that the tailgate now protrudes rearward of the vehicle, blocking the user from standing closer to the vehicle. Other motions of a tailgate, such as a side-hinged tailgate that opens to the side may allow a user to stand closer to the vehicle, but this motion requires significant clearance and does not allow the increased horizontal space that the dropped down tailgate provides. It would be desirable for a tailgate to be capable of more than one motion, along more than one trajectory, to more conveniently adapt to a user's needs. It would also be desirable to achieve more than one motion without adding significant hardware, requiring more than one actuator, or encroaching on bed access. It would also be desirable to reduce the number of components or use at least some common components for more than one motion.

SUMMARY

In some embodiments, a tailgate assembly includes a configurable linkage, and one or more latches, configured to control two motions of a tailgate. Accordingly, the tailgate may achieve a closed position, a dropped down position, and swung down position.

In some embodiments, a tailgate assembly includes a tailgate, a first link, a second link, and a first latch. For example, the first link, second link, tailgate and vehicle may form a four-bar linkage. The first link is coupled to the tailgate and configured to be coupled to the vehicle at a first hinge having a first rotational axis. The second link is coupled to the tailgate and coupled to the vehicle at a second hinge having a second rotational axis parallel to the first rotational axis. The first latch is configured to secure and release the first link to the vehicle at the first hinge. When the first latch is secured, the first link is configured to rotate about the first hinge and the tailgate is configured to achieve a swinging motion. For example, in some embodiments, the tailgate follows a trajectory defined by the four-bar linkage during the swinging motion. When the first latch is released, the first link is free to move away from the first hinge and the tailgate is configured to achieve a dropping motion. For example, in some embodiments, the tailgate follows a trajectory defined by a rotation about the second hinge during the dropping motion.

In some embodiments, the first link is coupled to the tailgate at a third hinge on a third rotational axis parallel to the first rotational axis. In some such embodiments, the first link is configured to rotate relative to the tailgate about the third rotational axis. In some embodiments, the second link is coupled to the tailgate at a fourth hinge on a fourth rotational axis parallel to the first rotational axis. In some such embodiments, the second link is configured to rotate relative to the tailgate about the fourth rotational axis.

In some embodiments, the tailgate may include links on both sides, to provide stability. Sides may refer to, for example, a driver's side and a passenger's side. A side may also be relative, referring to, for example, another reference of a tailgate assembly (e.g., a driver's side may be just off-center). The use of two or more linkages, all with shared rotational axes may provide stability, provide a trajectory having tighter tolerances, less stiff individual components, or a combination thereof. In some embodiments, the tailgate includes a first side (e.g., a driver's side), and a second side (e.g., a passenger's side) opposite to the first side. The first link and the second link are coupled to the first side of the tailgate. In some embodiments, a third link is coupled to the tailgate on the second side, and configured to be coupled to the vehicle at a fifth hinge having a rotational axis coincident with the first rotational axis. In some embodiments, a fourth link is coupled to the tailgate on the second side and coupled to the vehicle at a sixth hinge having a rotational axis coincident with the second rotational axis.

In some embodiments, the swinging motion of the tailgate includes a rotation of the first link about the first rotational axis relative to the vehicle, a rotation of the first link about the third rotational axis relative to the tailgate, a rotation of the second link about the second rotational axis relative to the vehicle, and a rotation of the second link about the fourth rotational axis relative to the tailgate. For example, the first and second links form a four-bar linkage with the tailgate and vehicle during the swinging motion.

In some embodiments, the dropping motion includes a rotation of the second link and tailgate about the second rotational axis relative to the vehicle. Accordingly, in some embodiments, the second link and the tailgate rotate together as a rigid body. In some embodiments, the tailgate assembly includes a second latch configured to secure and release the tailgate and the second link to each other, and the tailgate is configured to achieve the dropping motion when the second latch is secured.

In some embodiments, the tailgate is configured to achieve the swinging motion when the first latch is secured and the second latch is released. In some embodiments, the tailgate assembly includes a third latch configured to secure and release the tailgate to the vehicle. Accordingly, in some embodiments including the first, second, and third latches, the tailgate is in a closed position when the third latch is secured. Further, the tailgate is configured to achieve a swinging motion when the first latch is secured, the second latch is released, and the third latch is released. Further, the tailgate is configured to achieve a dropping motion when the first latch is released, the second latch is secured, and the third latch is released.

In some embodiments, the tailgate assembly includes a shaft coupled to the second link, and the shaft is coincident with the second rotational axis. In some embodiments, the shaft is configured to receive a torque from an electric motor, and to transmit the torque to the second link. For example, the shaft connects one or more links to an electric motor, which is configured to actuate the one or more links. In some embodiments, the shaft has a first end, and the electric motor is coupled to the first end of the shaft.

In some embodiments, the tailgate has a first side, and a second side opposite to the first side, where the first link and the second link are coupled to the first side of the tailgate. Sides may refer to, for example, a driver's side and a passenger's side. In some such embodiments, the tailgate assembly includes a third link coupled to the tailgate on the second side, and configured to be coupled to the vehicle at a fifth hinge having a rotational axis coincident with the first rotational axis. In some such embodiments, the tailgate assembly includes a fourth link coupled to the tailgate on the second side and coupled to the vehicle at a sixth hinge having a rotational axis coincident with the second rotational axis. In some such embodiments, the shaft is further coupled to the fourth link, and the shaft is configured to receive the torque from the electric motor between the second link and the fourth link. For example, the electric motor may be arranged between the second and fourth links. To illustrate, the first and third links may share rotational axes, and the second and fourth links may share rotational axes.

In some embodiments, the tailgate assembly includes a second latch configured to secure and release the tailgate and the second link to each other, and a third latch configured to secure and release the tailgate to the vehicle. In some such embodiments, the tailgate is in a closed position when the third latch is secured. In some such embodiments, the tailgate is configured to achieve a swinging motion when the first latch is secured, the second latch is released, and the third latch is released. In some such embodiments, the tailgate is configured to achieve a dropping motion when the first latch is released, the second latch is secured, and the third latch is released.

In some embodiments, the first rotational axis and the second rotational axis are substantially horizontal with respect the vehicle. For example, horizontal axes allow the tailgate to be dropped down and swung down, without the center of mass shifting to one side or the other.

In some embodiments, a vehicle includes a vehicle bed having a rear end, a side, and a tailgate assembly arranged at the rear end of the vehicle bed. The tailgate assembly includes a tailgate, and a four-bar linkage configured to connect the tailgate to the vehicle at the side of the vehicle. The tailgate assembly also includes a latch configured to secure and release a first link of the four-bar linkage from the vehicle. In some embodiments, the tailgate is configured to achieve a dropping motion relative to the vehicle when the latch is released. In some embodiments, the tailgate is configured to achieve a swinging motion relative to the vehicle when, the latch is secured.

In some embodiments, the vehicle includes an actuator coupled to the second link and configured to transmit torque to the second link, a power supply configured to power the actuator, and control circuitry configured to provide power to the actuator from the power supply to cause the tailgate to achieve the dropping motion and the swinging motion.

In some embodiments, a technique for controlling a tailgate assembly includes receiving an indication to activate a swinging motion. In response to the indication, the technique includes securing the latch, and actuating the actuator to cause the tailgate to achieve the swinging motion.

In some embodiments, a technique for controlling a tailgate assembly includes receiving an indication to activate a dropping motion. In response to the indication, the technique includes releasing the latch, and actuating the actuator to cause the tailgate to achieve the dropping motion.

BRIEF DESCRIPTION OF THE DRAWINGS

The present disclosure, in accordance with one or more various embodiments, is described in detail with reference to the following figures. The drawings are provided for purposes of illustration only and merely depict typical or example embodiments. These drawings are provided to facilitate an understanding of the concepts disclosed herein and shall not be considered limiting of the breadth, scope, or applicability of these concepts. It should be noted that for clarity and ease of illustration these drawings are not necessarily made to scale.

DETAILED DESCRIPTION

The present disclosure describes a swing and drop tailgate assembly, which allows for dual functionality of the tailgate assembly. For example, the tailgate assembly may achieve a drop configuration similar to a standard tailgate (e.g., rotating about a hinge axis) to allow access to a vehicle cargo space or bed. Additionally, the tailgate assembly may achieve a swing configuration (e.g., using at least one four-bar mechanism) while remaining nearly vertical, allowing the user to stand nearer to the bed, for example. The swing and drop tailgate assembly may allow a user to access the bed, a rear bin in the bottom of the bed, or the side of the bed (e.g., near a wheel well) by dropping the tailgate (e.g., rotating down), or by swinging the tailgate down (e.g., using the four-bar mechanism). A control system may be used, for example, to determine when to activate each motion, when not to activate each motion, to activate each motion via an actuator, or otherwise control operation of the tailgate assembly. A tailgate assembly may be operated in a manual configuration (e.g., without a control system and actuators), an automatic configuration (e.g., with a control system and actuators), or a combination thereof.

In some embodiments, a tailgate assembly may include a tailgate, a linkage, and one or more latches. The latches, and latched states thereof, may constrain the tailgate to undergo a dropping motion (e.g., a rotation), undergo a swinging motion (e.g., via a four-bar linkage to achieve rotation and translation), or achieve a closed position. In some embodiments, a tailgate assembly may be operated (e.g., undergo at least one motion) using control circuitry responding to the pressing of one or more push buttons. For example, when a first push button is pressed by a user, the control system may activate a drop motion, and when a second push button is pressed by a user, the control system may activate a swing motion.

In commonly assigned application Ser. No. 16/004,246, filed on Jun. 8, 2018, reference is made to a tailgate assembly having a post assembly and a tailgate. For example, the post assembly is used to provide an intermediate structure, which may move relative to the vehicle, and against which the tailgate may move. In some embodiments, the present disclosure describes a tailgate assembly not having an intermediate structure (e.g., a post-less tailgate assembly).

Figure 1:
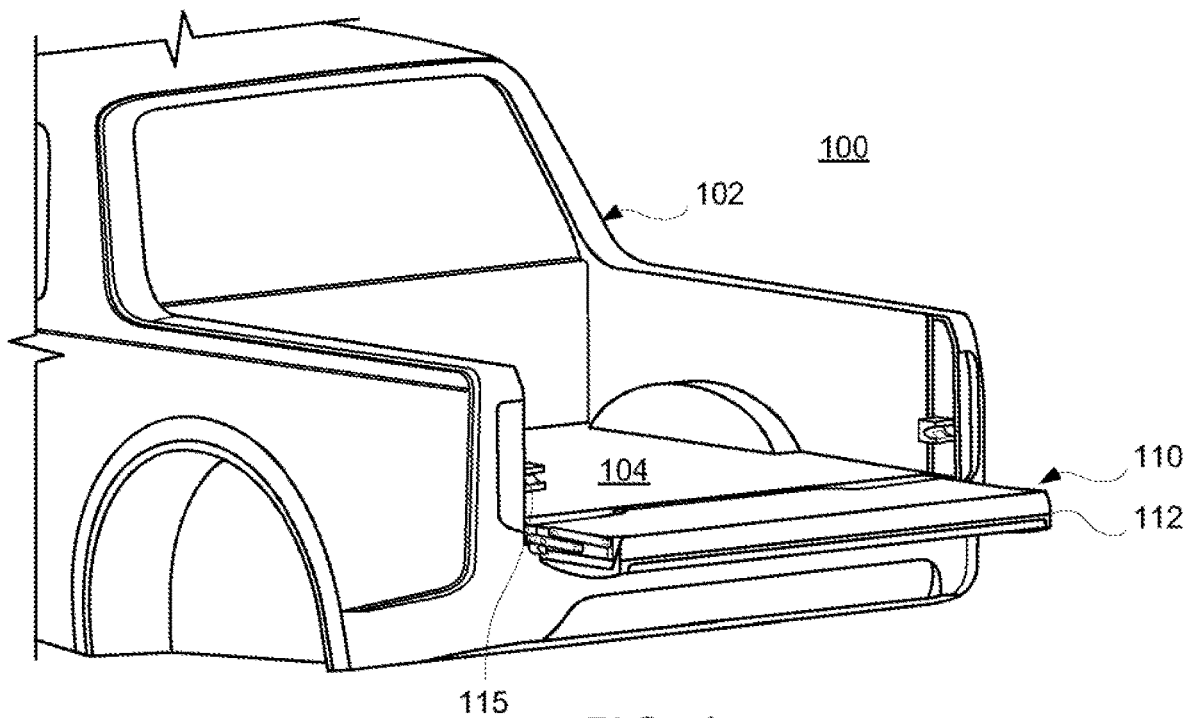
FIG. 1 shows a perspective view of a tailgate assembly of a vehicle in a dropped configuration, in accordance with some embodiments of the present disclosure.
Figure 2:
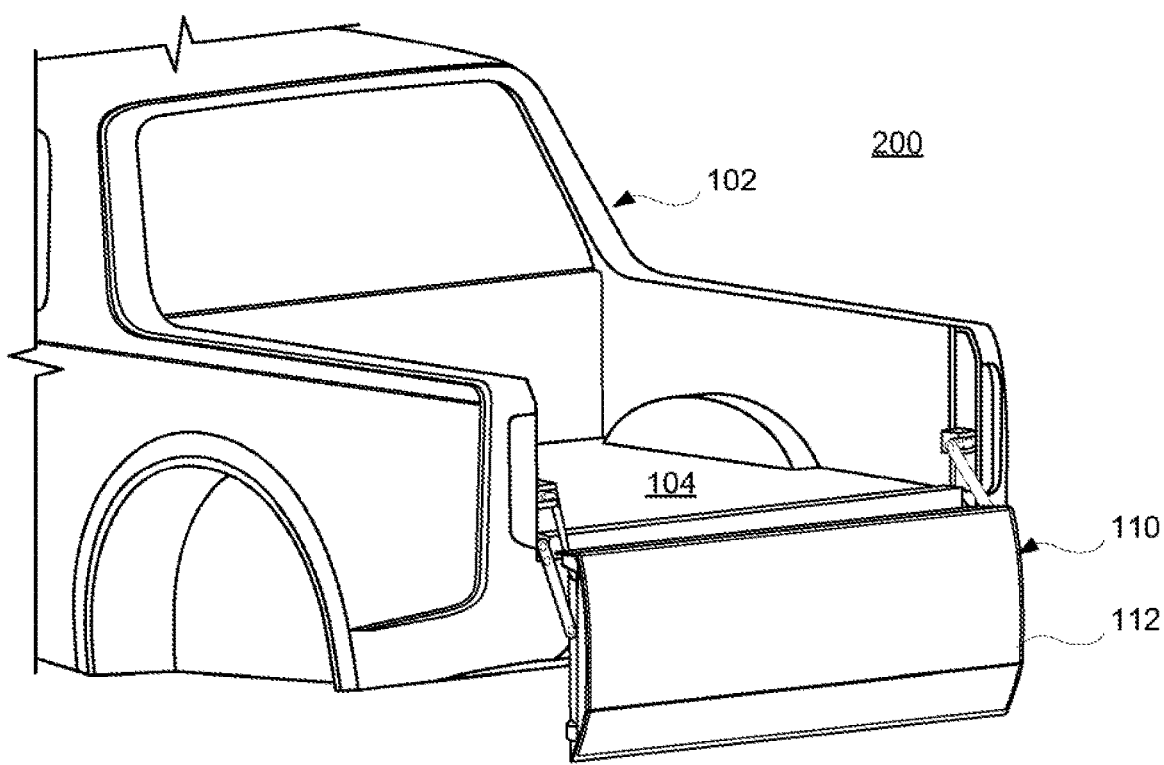
FIG. 2 shows a perspective view of the tailgate assembly of the vehicle of FIG. 1 in a swung down configuration, in accordance with some embodiments of the present disclosure.

FIG. 1 shows a perspective view of tailgate assembly 110 of vehicle 102 in dropped configuration 100, in accordance with some embodiments of the present disclosure. FIG. 2 shows a perspective view of tailgate assembly 110 of vehicle 102 of FIG. 1 in swung down configuration 200, in accordance with some embodiments of the present disclosure. Tailgate assembly 110 includes tailgate 112, which is coupled to vehicle 104 by linkages. Vehicle 102 includes bed 104, which is bounded by tailgate assembly 110 at the rear of vehicle 102.

In some circumstances, when access to, or use of, bed 104 is desired, dropped configuration 100 (i.e., "dropped down") may be preferred by a user. For example, tailgate 112 may rotate about 90° down about a rotational axis to open the rear of vehicle 102 for access by a user, as shown by dropped configuration 100. Surface 116 of tailgate 112 may be horizontal when in dropped configuration 100, and accordingly may be used to rest items (e.g., cargo or tools), users (e.g., for a user to sit on), or both. For example, it is sometimes useful to place items on tailgate 112 when dropped down prior to loading the items into bed 104. Further, dropped configuration 100 may be useful when oversized items (e.g., fence posts, re-bar, piping, or a surfboard) are loaded into bed 104, but must overhang the rear of vehicle 102 during driving of vehicle 102.

In some circumstances, when access to, or use of, bed 104 is desired, swung down configuration 200 may be preferred by a user. For example, tailgate 112 may swing down to open the rear of vehicle 102 for access by a user, as shown by swung down configuration 200. It is sometimes useful, for example, for a user to be able to stand closer to vehicle 102 to access bed 104 than would be possible in dropped configuration 100. Swung down configuration 200 may allow closer access. For example, a cargo hatch, tool bin, spare wheel, or other feature in the floor of bed 104 may be more easily accessed by a user with tailgate 112 in swung down configuration 200 as opposed to dropped configuration 100. Further, swung down configuration 200 may be useful when oversized items (e.g., fence posts, re-bar, piping) are loaded into bed 104, but must overhang the rear of vehicle 102 during driving of vehicle 102. In a further example, tailgate 112 may be actuated into swung down configuration 200 while vehicle 102 is moving to provide increased aerodynamic drag on vehicle 102 (e.g., to assist braking or otherwise slow vehicle 102). In a further example, in circumstances in which space to the rear of vehicle 102 is limited (e.g., in a parking lot), swung down configuration 200 may be preferred to dropped configuration 100 as the total length of vehicle 102 may be relatively shorter (e.g., tailgate 112 does not stick out as far from the rear of bed 104).

Figure 3:
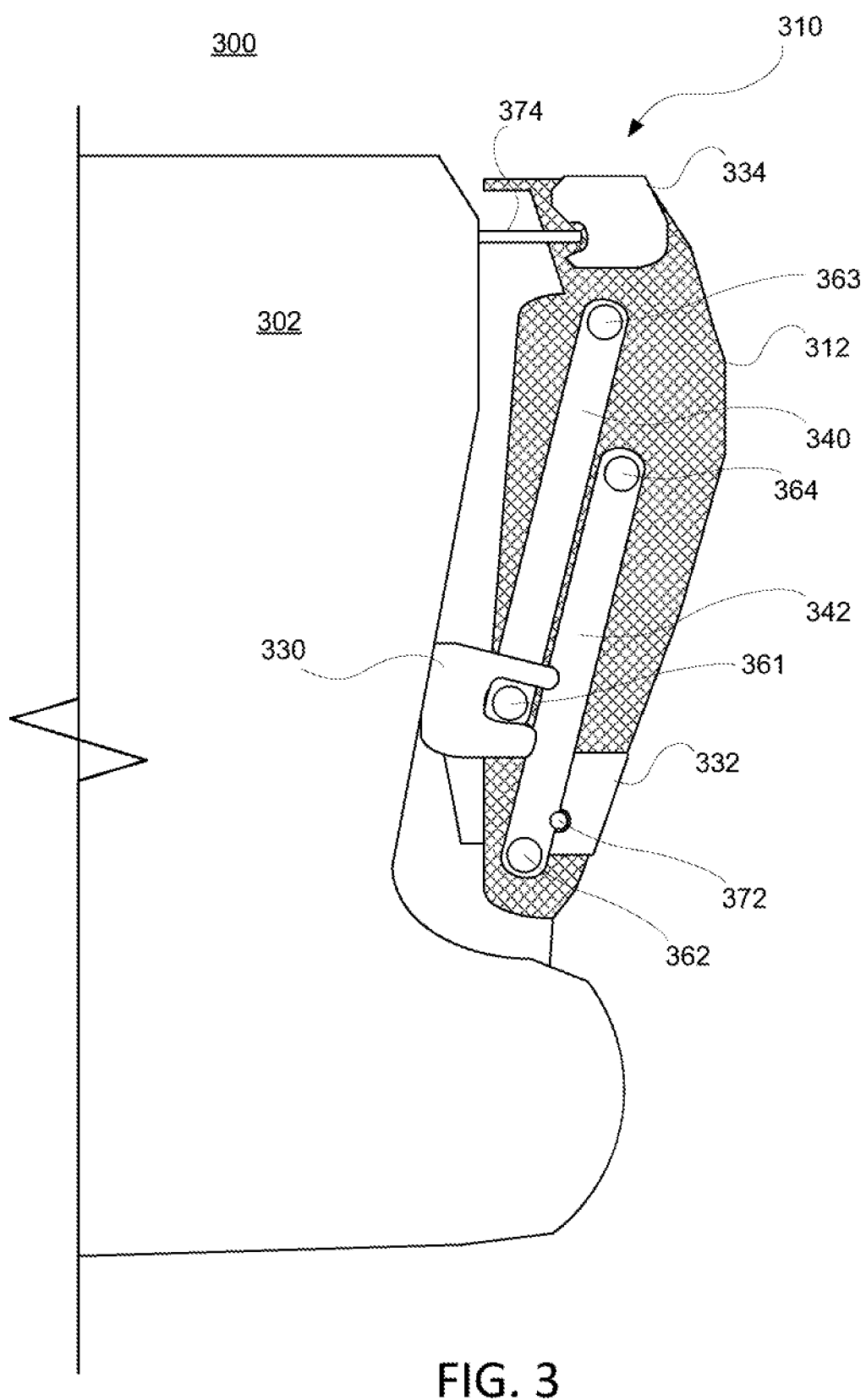
FIG. 3 shows a side view of an illustrative tailgate assembly in a closed configuration, in accordance with some embodiments of the present disclosure.

FIG. 3 shows a side view of illustrative tailgate assembly 310 in a closed configuration 300, secured to vehicle 302, in accordance with some embodiments of the present disclosure. Tailgate assembly 310 includes tailgate 312, link 340 and link 342, latch 330, latch 332, latch 334, and hinges 361-364.

Tailgate 310 is configured to move relative to vehicle 302, for example, with trajectories constrained by links 340 and 342. Link 340 is configured to rotate about hinge 361 at vehicle 302 (e.g., when latch 330 is secured) and hinge 363 at tailgate 312. Link 342 is configured to rotate about hinge 362 at vehicle 302 and hinge 364 at tailgate 312 (e.g., when latch 332 is released between link 342 and tailgate 312). It will be understood that a similar pair of linkages may be included on the opposite side of the tailgate as that shown in FIGS. 3-5, to provide stability, reduce deflection (e.g., due to gravity or other forces), provide additional latching locations, or a combination thereof.

Figure 4:
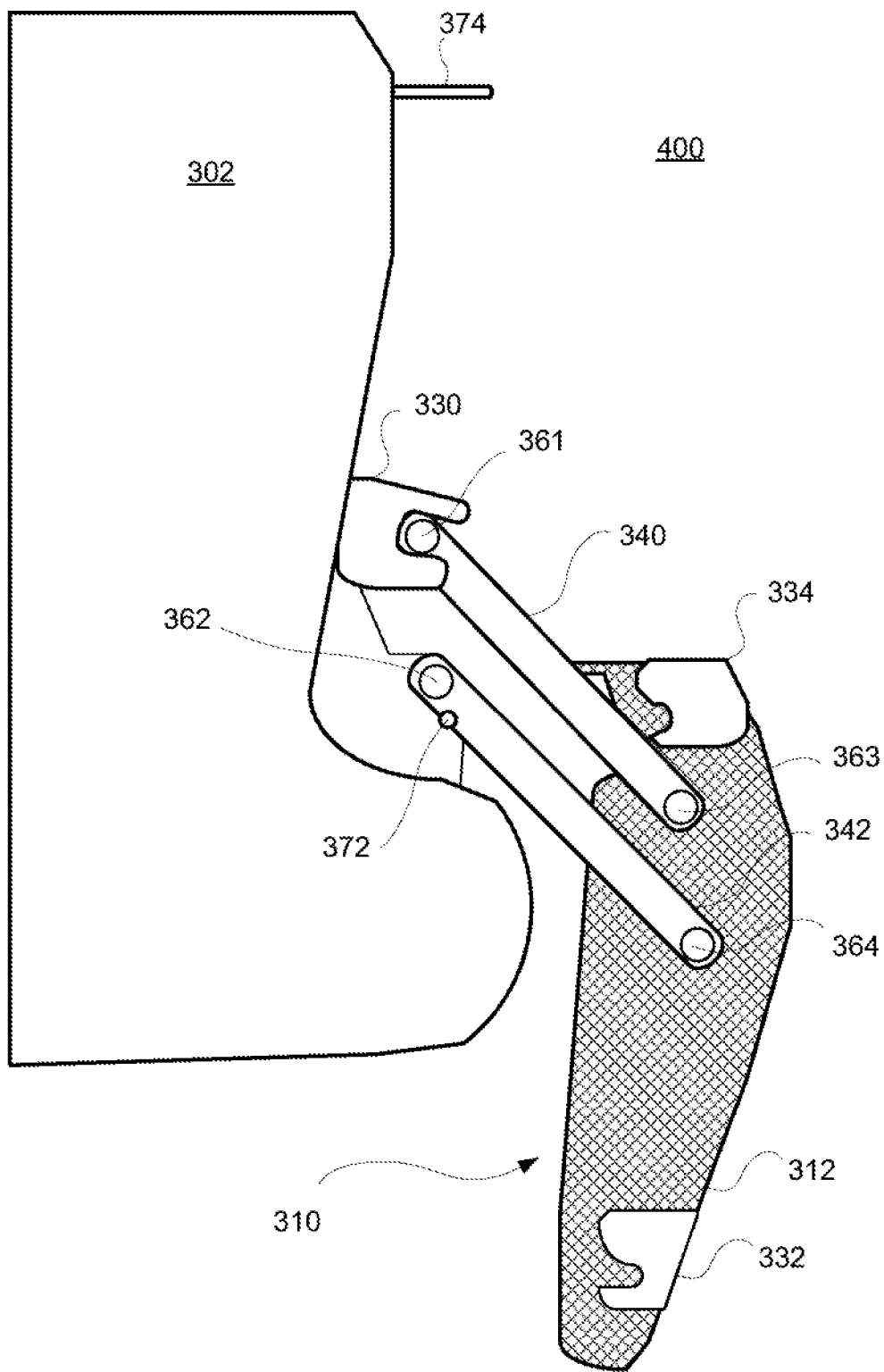
FIG. 4 shows a side view of the illustrative tailgate assembly of FIG. 3 in a swung down configuration, in accordance with some embodiments of the present disclosure.

When hinge 361 is secured (e.g., captured) by latch 330, latch 334 is released, and latch 332 is released, tailgate 312 may undergo a swinging motion via the resulting four-bark linkage (i.e., links 340 and 342 connecting rigid bodies vehicle 302 and tailgate 312). FIG. 4 shows a side view of illustrative tailgate assembly 310 of FIG. 3 in swung down configuration 400, in accordance with some embodiments of the present disclosure. The trajectory of tailgate 312 between closed configuration 300 and swung down configuration 400 is constrained by the four-bar linkage.

Figure 5:
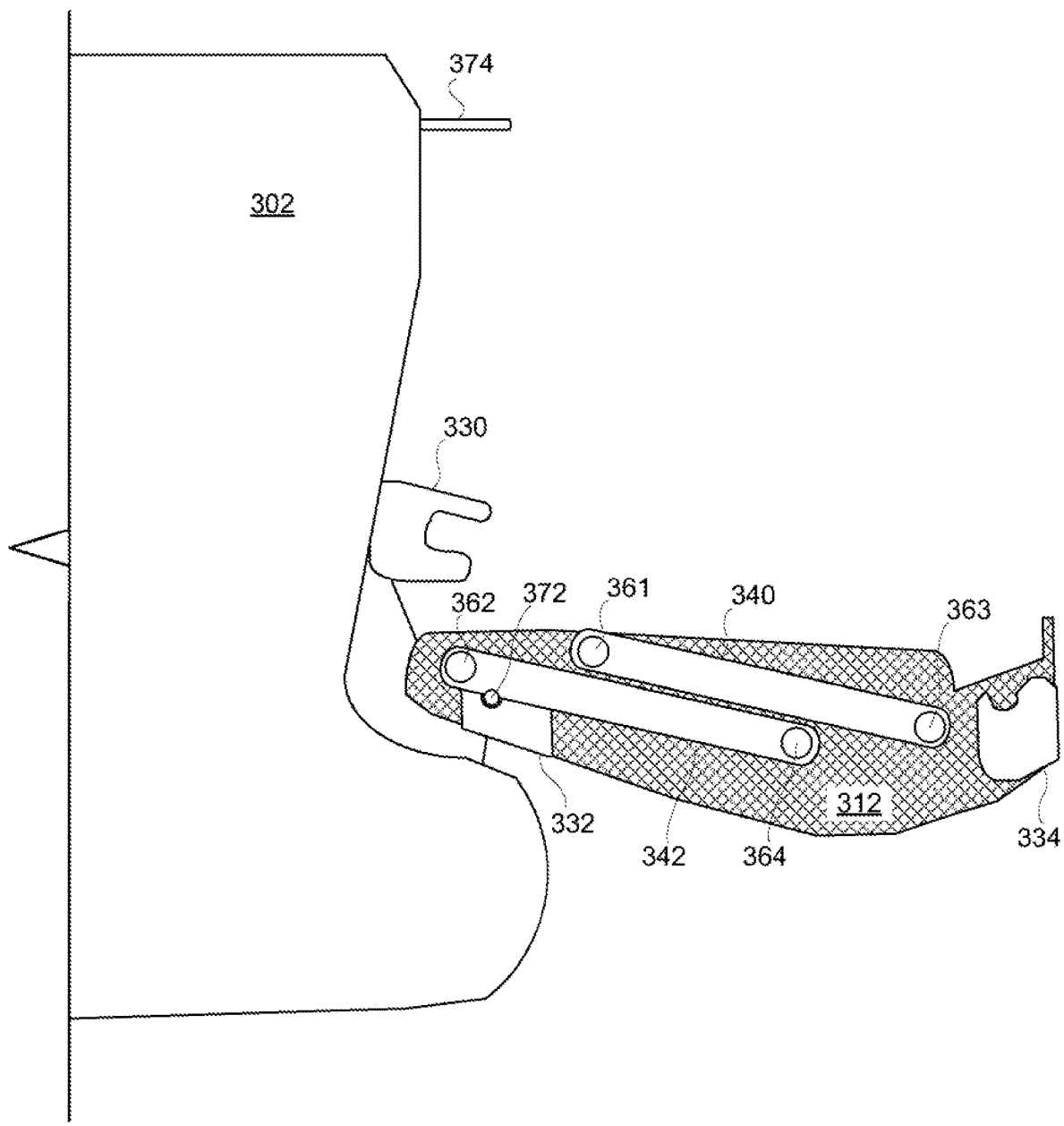
FIG. 5 shows a side view of the illustrative tailgate assembly of FIG. 3 in a dropped down configuration, in accordance with some embodiments of the present disclosure.

When hinge 361 is released by latch 330 (e.g., as shown in FIG. 5), latch 334 is released, and latch 332 is secured (e.g., captures pin 372), tailgate 312 may undergo a dropping motion via the resulting rotational axis at hinge 362 (i.e., link 342 is connected rigidly to tailgate 312, and can rotate about hinge 362). Link 340, during the dropping motion with latch 330 released, does not constrain motion of tailgate 312. Accordingly, link 340 may be secured to tailgate 312, be free to move independently, or be otherwise constrained to move relative to tailgate 312 (e.g., with a spring, detent, or other rotational element), when latch 330 is released. FIG. 5 shows a side view of illustrative tailgate assembly 310 of FIG. 3 in dropped down configuration 500, in accordance with some embodiments of the present disclosure. The trajectory of tailgate 312 between closed configuration 300 and dropped down configuration 500 is constrained by hinge 362.

Figure 6:
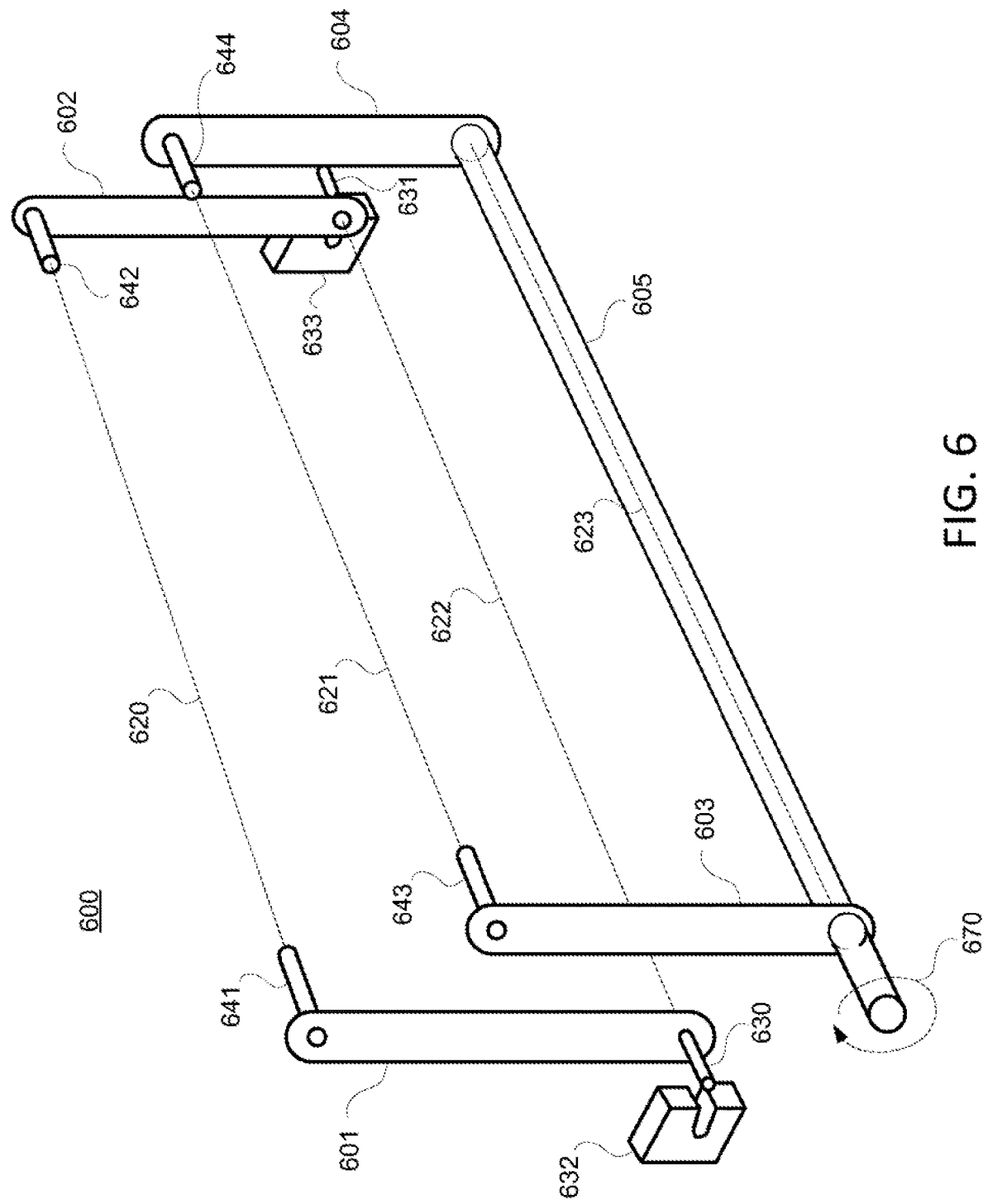
FIG. 6 shows a perspective view of links of a tailgate assembly, in accordance with some embodiments of the present disclosure.

FIG. 6 shows a perspective view of links 601-604 of a tailgate assembly 600, in accordance with some embodiments of the present disclosure. Tailgate assembly 600, as illustrated in FIG. 6, does not include a tailgate, as well as some other hardware, for purposes of clearly showing links 601-604.

Links 603 and 604 are connected by shaft 605, and are configured to rotate about rotational axis 623 (e.g., shown by motion arrow 670). Rotational axis 623 is, in some embodiments, fixed relative to a corresponding vehicle. In some embodiments, an actuator may be coupled to shaft 605 to transmit torque to shaft 605. Hinges 643 and 644 of respective links 603 and 604 are configured to couple to a tailgate (not shown in FIG. 6), allowing relative motion between links 603 and 604, and the tailgate about respective rotational axis 621.

Links 601 and 602 are configured to rotate similarly relative to the tailgate about rotational axis 620, via respective hinges 641 and 642. Latches 632 and 633, as illustratively shown in FIG. 6, are configured to capture and release hinges 630 and 633, respectively. Links 601 and 602 are also configured to rotate about rotational axis 622, via respective hinges 630 and 631, when latches 632 and 633 are secured. Accordingly, when latches 632 and 633 are secured, and links 601 and 602 are constrained to rotate about rotational axis 622, the tailgate may undergo a swinging motion. When latches 632 and 633 are released, links 601 and 602 are no longer constrained to rotate about rotational axis 622, and may, for example, undergo a dropping motion.

Rotational axes 620-623 are parallel, thereby allowing both the swinging and dropping motions under suitable latching. Hinges 641-644 and 630-631 include any suitable type of hinge, in accordance with the present disclosure. For example, a hinge may include a pin and bushing combination, a ball bearing, a pin bearing, a taper bearing (e.g., a thrust bearing), or a contact bearing. For example, hinges 630 and 631 may each include a respective pin rigidly connected to respective links 601 and 602, each inside of a respective tubular bushing, wherein the bushings can be secured and released by respective latches 630 and 631. Any, or all, of hinges 641-644 and hinges 630 and 631 may be greased, oiled, solid-film lubricated, or not lubricated.

In some embodiments, links 602 and 604 need not be included. For example, links 601 and 603 may be stiff enough to support the tailgate and corresponding motion, and hinges 630 and 670 may be strong enough to support the weight, and other forces, acting on the tailgate. In some such embodiments, stiffer hinges, links, and latches are included, and all components are suitably larger (e.g., thicker) to provide the stiffness. Any suitable number of links, hinges, and latches may be used to allow a dropping motion and a swinging motion of a tailgate, in accordance with the present disclosure.

Figure 7:
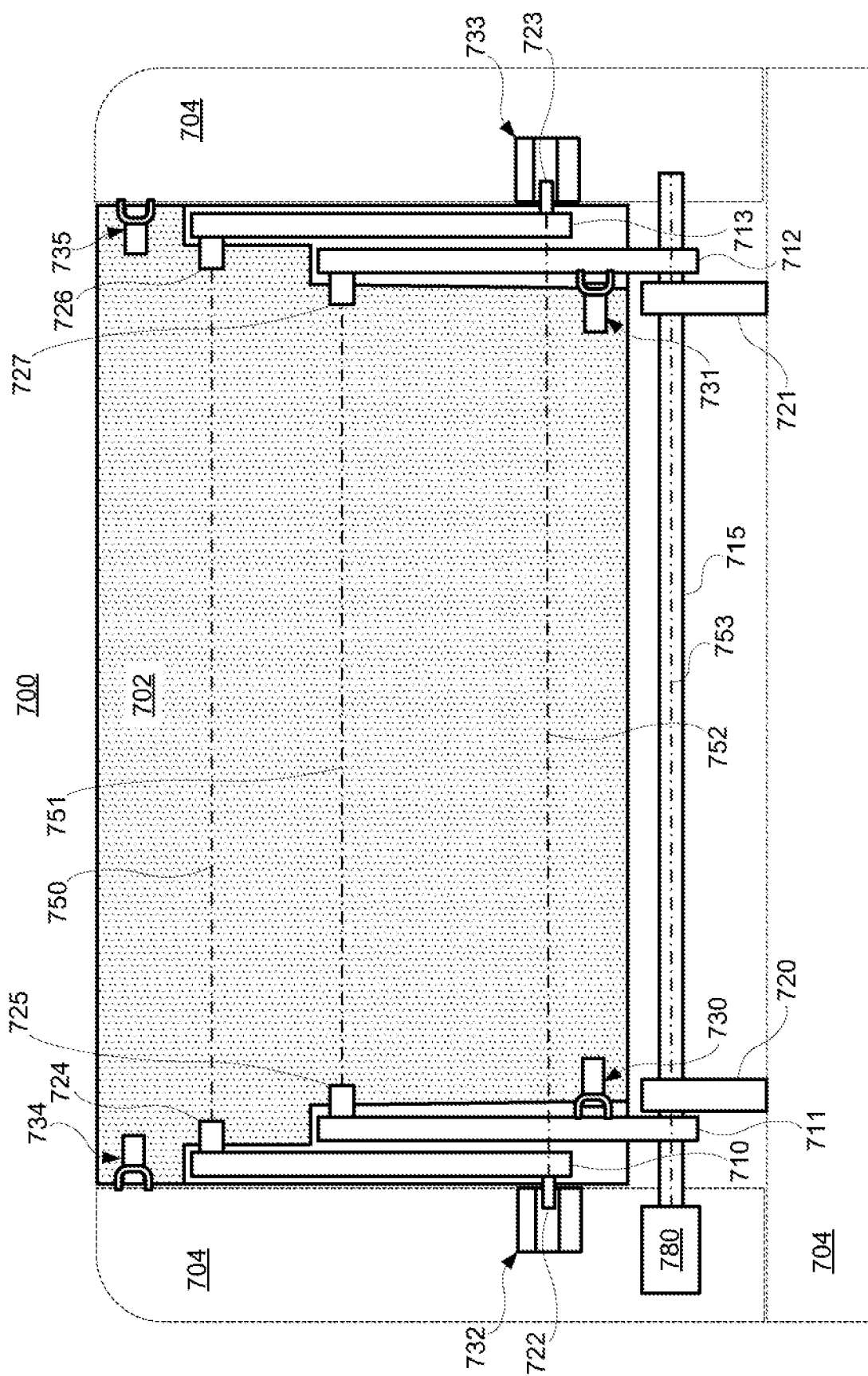
FIG. 7 shows a face view of an illustrative tailgate assembly, in accordance with some embodiments of the present disclosure.

FIG. 7 shows a face view of illustrative tailgate assembly 700, in accordance with some embodiments of the present disclosure. The face view is from the bed of vehicle 704 looking backwards at the rear tailgate 702. Tailgate assembly 700 includes tailgate 702, links 710-713, hinges 720-727, latches 730-735, shaft 715, and actuator 780. Tailgate assembly 700 is configured to couple to vehicle 704 (e.g., shown by a dashed outline in FIG. 7), providing, for example, a rear tailgate to a bed of vehicle 704.

Links 710 and 711 form a four-bar linkage with tailgate 702 and vehicle 704, when latch 732 secures hinge 722. Similarly, links 712 and 713 form another four-bar linkage with tailgate 702 and vehicle 704, when latch 733 secures hinge 723. When latches 732 and 733 are released (e.g., and no longer constrain respective hinges 722 and 723), the four-bar linkages can no longer be strictly formed. For example, if latches 730-735 are released, under some loading the links may act as four-bar linkages, and under other loadings might not).

Links 711 and 712 are rigidly coupled to shaft 715, and are configured to rotate about rotational axis 753 (e.g., in response to torque transmitted by actuator 780). Links 711 and 712 are coupled to tailgate 702, via respective hinges 725 and 727, and are configured to rotate about rotational axis 751 relative to tailgate 702. Links 711 and 712 may be secured to tailgate 702 via respective latches 730 and 731. As shown, latches 730 and 731 include loops rigidly connected to respective links 711 and 712, and respective capturing mechanisms configured to capture the respective loops.

Links 710 and 713 are coupled to tailgate 702, via respective hinges 724 and 726, and are configured to rotate about rotational axis 750 relative to tailgate 702. Links 710 and 713 may be secured to vehicle 704 via respective latches 732 and 733. As shown, latches 732 and 733 include respective pins rigidly connected to links 710 and 713, and respective capturing mechanisms rigidly coupled to vehicle 704 configured to capture the respective pins.

The term "latches" as used herein, refers to the complete latch assembly, include hardware connected to different parts that are configured to be secured to and released from each other. Accordingly, any portion of a latch may be mounted to either suitable component. In some embodiments, the loop and capturing mechanism are on opposite components. For example, the loop may be on a link, and the capturing mechanism may be on a tailgate. In a further example, the loop may be on the tailgate and the capturing mechanism may be on the link).

Actuator 780 is shown connected to shaft 715 in FIG. 7, but may be coupled to shaft 715 via a gearbox, a belt drive, a clutch, any other suitable coupling, or any combination thereof. For example, in some embodiments, actuator 780 is coupled to shaft 715 via a gearbox, providing a gear reduction, to increase torque on shaft 715. A rotation axis of actuator 780 need not be coincident with, nor parallel to, axis 753 if a gearbox or other suitable coupling is used. For example, a gearbox may include bevel gears, with perpendicular rotational axes, and accordingly the rotational axis of the actuator may be perpendicular to axis 753. In some embodiments, actuator 780 is arranged between links 711 and 712 (e.g., in the middle of shaft 715). In some embodiments, actuator 780 is coupled to links 711 and 712 at axis 751 (e.g., actuator 780 may be rigidly coupled to tailgate 702 rather than vehicle 704 to actuate relative motion).

Mounts 720 and 721 are rigidly connected to vehicle 704, and are configured to allow shaft 715 to rotate about rotational axis 753, but constrain other motion. For example, mounts 720 and 721 may each include a bushing configured to allow shaft 715 to rotate. During the dropping motion, when latches 732 and 733 are released, latches 734 and 735 released, and latches 730 and 731 are secured, tailgate 702 is configured to rotate about axis 753.

Any of hinges 720-727 may include rotational elements. Rotational elements include, for example, a rotational damper to dampen rotational motion, an encoder (e.g., a potentiometer, an optical encoder, or a magnetic encoder) to indicate rotational position, torsion springs, any other suitable components, or any combination thereof. In some embodiments, actuator 780, shaft 715, mounts 720 and 721, or any suitable combination thereof, include one or more rotational elements.

Figure 8:
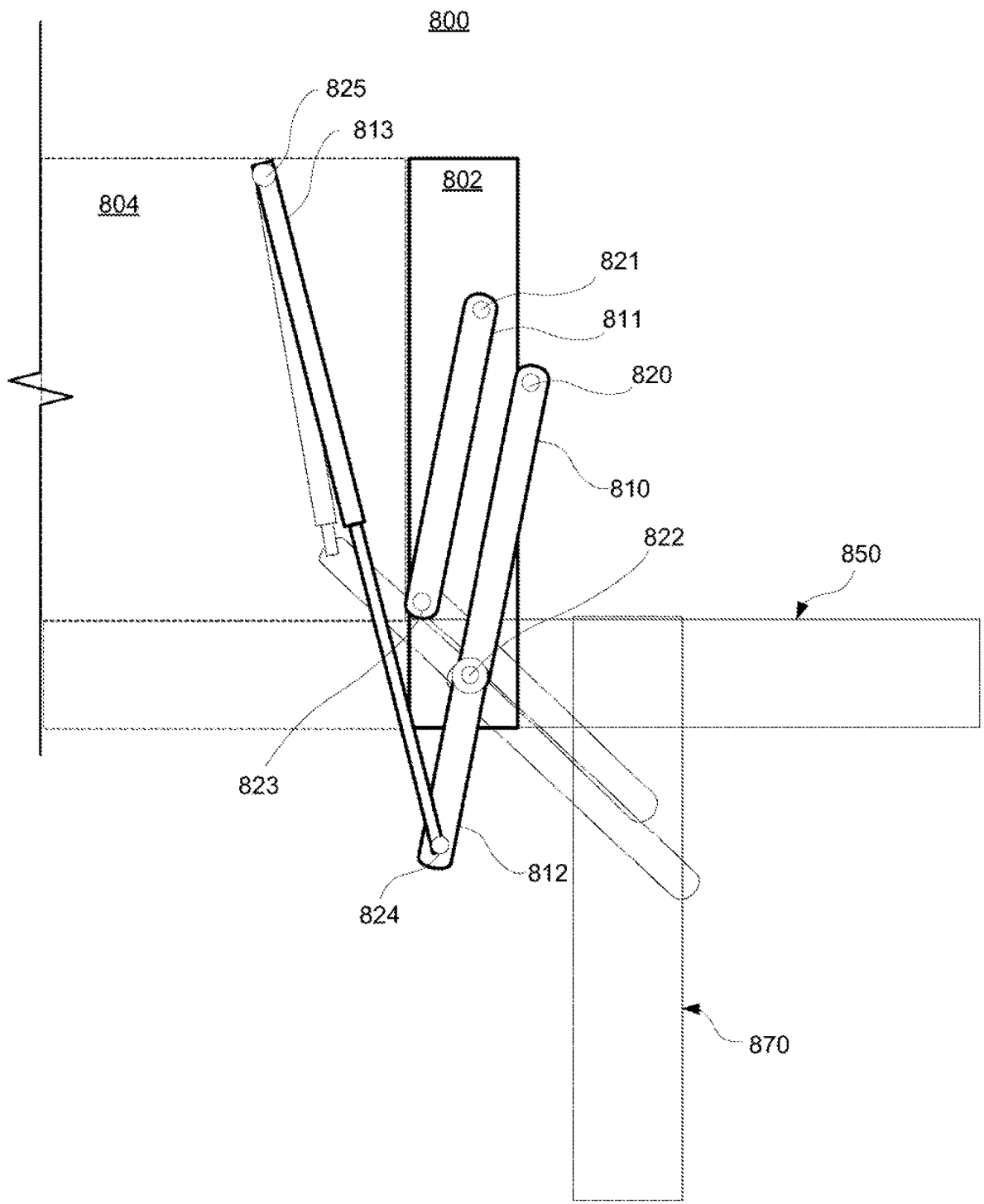
FIG. 8 shows a side view of an illustrative tailgate assembly in several positions, in accordance with some embodiments of the present disclosure.

FIG. 8 shows a side view of illustrative tailgate assembly 800 in several positions, in accordance with some embodiments of the present disclosure. Tailgate assembly 800 includes tailgate 802, links 810-811, arm 813, and hinges 820-825. Latches, along with some other hardware (e.g., a second linkage on the opposite side of the tailgate) are not shown in FIG. 8 for clarity. Tailgate assembly 800 is configured to couple to vehicle 804, providing, for example, a rear tailgate to a bed of vehicle 804. Extension 812 is an extension of link 810, rotating as a rigid body with link 810 about hinge 822.

Configuration 850 is the dropped down configuration of tailgate assembly 800, achieved by rotating tailgate 802 about hinge 822 (e.g., with corresponding latches suitably secured or released). Configuration 870 is the swung down configuration of tailgate assembly 800, achieved by swinging tailgate 802 about hinges 822 and 823 via respective links 810 and 811 (e.g., with corresponding latches suitably secured or released). Links 810 and 812 are shown as dotted lines in configuration 870, but are not shown for dropped down configuration 850.

Arm 813 is coupled to vehicle 804 via hinge 825, which allows rotation of arm 813 relative to vehicle 804. Arm 813 is coupled to extension 812 via hinge 824, which allows rotation of arm 813 relative to extension 812. Arm 813, as illustratively shown in FIG. 8, is configured to expand and contract along its long axis. Arm 813 is shown as a dotted line in the swung down configuration, wherein the length has changed relative to its length in the fully closed configuration. In some embodiments, arm 813 includes a dampener (e.g., a pneumatic or hydraulic dampener), a spring, a linear actuator, a mechanical hard-stop, or any suitable combination thereof. Arm 813 may include an equilibrium length wherein there is no force along the long axis of arm 813. For example, arm 813 may include a spring, with an equilibrium position corresponding to a closed configuration of tailgate 802, and during swing down the spring may act against gravity to lessen acceleration of, or reduce a required torque to move, tailgate 802 (e.g., the spring may act as a preload). In a further example, arm 813 may include a dampener that resists motion along the long axis of arm 813 (e.g., provides a resistive force proportional to velocity along the long axis of arm 813). In a further example, arm 813 may include a linear actuator that actuates motion along the long axis of arm 813.

In some embodiments, for example, arm 813 is coupled to tailgate 802, link 811, link 810, or one of hinges 820-822, rather than extension 812. In some embodiments, arm 813 may be replaced by, or accompanied by, a cable, which is pinned at vehicle 804 and at tailgate 802, which has a length configured to limit the motion of tailgate 802 relative to vehicle 804. In some embodiments, arm 813 may be accompanied by a similar counterpart on the other side of tailgate 802 (e.g., the far side as viewed in FIG. 8). In some embodiments, arm 813 may be replaced by, or accompanied by, a rotational element at one or more hinge. For example, any suitable rotational element which may impart torque on a link, the tailgate, or both, may be included in a tailgate assembly.

Figure 9:
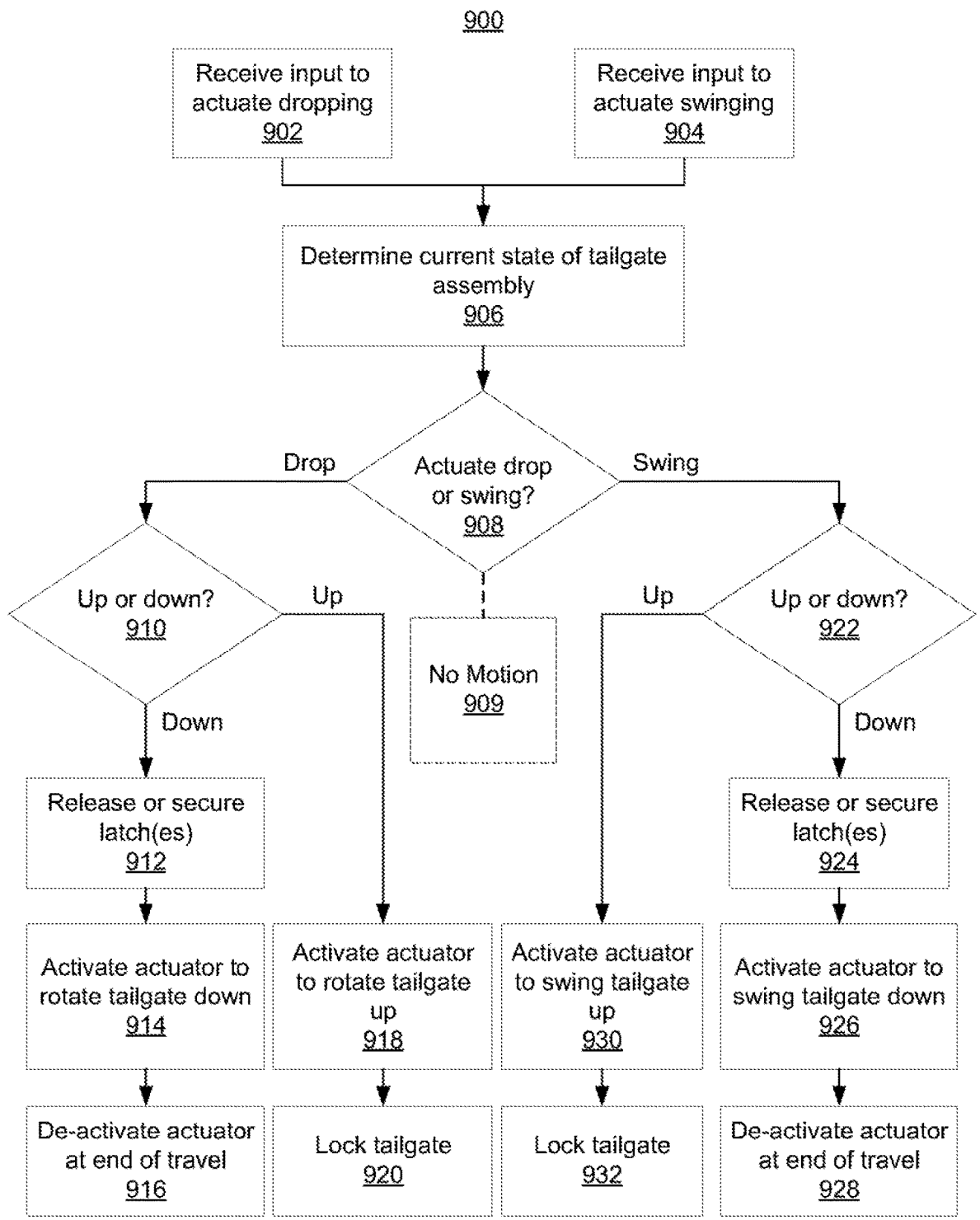
FIG. 9 is a flowchart of an illustrative process for managing motion of a tailgate assembly, in accordance with some embodiments of the disclosure.

FIG. 9 is a flowchart of illustrative process 900 for managing motion of a tailgate assembly, in accordance with some embodiments of the disclosure. It should be noted that process 900 or any step thereof could be performed on, or provided by, the system of FIG. 10. In addition, one or more steps of process 900 may be incorporated into or combined with one or more other steps described herein.

Step 902 includes control circuitry receiving an input to actuate a dropping motion. The input may include, for example, an indication that a button was pressed, a selection by a user, a signal from a key fob, any other suitable input, or any combination thereof. In some embodiments, the control circuitry receives the input to actuate the dropping motion as a signal at one or more IO pins of the control circuitry.

Step 904 includes control circuitry receiving an input to actuate a swinging motion. The input may include, for example, an indication that a button was pressed, a selection by a user, a signal from a key fob, any other suitable input, or any combination thereof. In some embodiments, the control circuitry receives the input to actuate the swinging motion as a signal at one or more IO pins of the control circuitry.

Step 906 includes control circuitry determining a current state of the tailgate assembly, or portion thereof. A current state of the tailgate assembly may include, for example, a position of a tailgate, a direction of motion of a tailgate, a state of one or more latches (e.g., open or closed, released or secured), state of an actuator, state of a cinch actuator, position of a linkage (e.g., an angular position about a rotational axis as measured by an encoder), state of a linkage (e.g., secured by a latch, fully closed position, fully swung position, or fully dropped position), any other suitable state that the tailgate assembly or portion thereof is in, or any combination thereof. For example, one or more electrical switches or contact may be configured to indicate when the tailgate is secured to the vehicle (e.g., in a closed position). In some embodiments, the control circuitry receives input from one or more sensors to indicate the current state of the tailgate assembly or portion thereof. For example, one or more proximity sensors may indicate whether the tailgate is closed. In some embodiments, the control circuitry performs a safety check (e.g., that latches are in a safe, or predetermined, position), a system check (e.g., the battery has sufficient voltage or power, or that a fuse is intact), or other diagnostic (e.g., check that a key is in the auxiliary position or ON position) to determine the current state of the tailgate assembly.

Step 908 includes control circuitry determining whether to actuate a dropping motion or a swinging motion of the tailgate. In some embodiments, the control circuitry determines whether to actuate a dropping motion or a swinging motion based on a current state of the tailgate assembly (e.g., determined at step 906), or a portion of the tailgate assembly thereof, based on a received input (e.g., from steps 902 or 904), based on any other suitable information, or based on any combination thereof. In some embodiments, the control circuitry determines whether to activate a dropping motion or a swinging motion based on a predetermined table, database, or other information. For example, the state of each latch, and the state of one or more links that are a safe starting point to actuate a motion may be included in a table. If the control circuitry determines that the current state of the tailgate assembly corresponds to a safe state, then the control circuitry may determine whether to actuate the dropping motion, the swinging motion, or no motion (e.g., if it is determined that no motion is safe, appropriate, or available to achieve).

In some embodiments, the control circuitry determines that no motion is to be actuated at step 909. For example, the control circuitry may determine that no motion is to be performed if no power is available, the tailgate assembly is not ready to undergo a motion (e.g., a latch state is unknown, the actuator is shorted, a user has not unlocked the tailgate), no usable input is received (e.g., an error such as a user selecting to swing down when the tailgate is already swung down), any other suitable criterion, or any combination thereof.

If the control circuitry determines to actuate the dropping motion at step 908, the control circuitry may proceed to step 910, which includes control circuitry determining which direction to cause rotation of the actuator in (e.g., clockwise or counter clockwise). In some embodiments, the direction is indicated by which button is pressed (e.g., there are up and down buttons, position of a double throw toggle switch), which option is selected (e.g., a button on a key fob pressed by a user), or both. In some embodiments, the control circuitry determines the direction based on input received from a sensor. For example, if the tailgate assembly is in a closed position as determined by a proximity switch, the control circuitry may determine to rotate the tailgate assembly down (e.g., to open the tailgate assembly and provide access to a vehicle bed). In some embodiments, the control circuitry determines which direction to cause rotation in based on the current state of the tailgate assembly. For example, the control circuitry may determine the current state to be that the tailgate assembly is fully dropped down based on a limit switch, and accordingly, the control circuitry may determine to cause rotation upwards (e.g., to close the tailgate assembly).

Step 912 includes control circuitry releasing one or more first latches. In some embodiments, control circuitry sends a signal to secure or release one or more latches. For example, the control circuitry may activate a relay to provide fused 12 V battery power to secure or release a latch. In a further example, the control circuitry may provide 12 V battery power to secure or release a cinch actuator (e.g., thereby preventing or allowing at least one motion). If one or more first latches is already secured or released, as intended, step 912 need not be performed.

Step 914 includes control circuitry activating an actuator, actuating one or more linkages, to rotate the tailgate down, based on a determination at step 910. In some embodiments, the control circuitry applies power to the actuator by applying voltage to suitable pins of a relay (e.g., applying 12 V across the control pins), wherein suitable pins of the relay (e.g., +12 V power and ground) are wired to the actuator. In some embodiments, the control circuitry generates a relatively low voltage and/or current control signal (e.g., 3.3 VDC, 5 VDC, 4-20 mA, a 5V pulse, or a 5 V PWM) to activate a relay (e.g., a mechanical relay, or a solid-state relay), a contactor, a transistor, any other suitable power electronics or components, or any combination thereof. In some embodiments, the control circuitry generates a signal that is based at least in part on the determined direction of step 910. For example, a relative polarity of two pins may change based on which direction the motion is to be in.

In some embodiments, control circuitry determines not to perform step 912, step 914, or both. For example, if the tailgate is already swung down, then the control circuitry may determine not to perform step 912, step 914, or both (e.g., to prevent a damaging or dangerous configuration). In some embodiments, the control circuitry, for example, first suitably actuates the tailgate assembly, or components thereof (e.g., a tailgate), to a fully closed position before activating the actuator to rotate the tailgate down.

Step 916 includes control circuitry de-activating the actuator at an end of travel (e.g., the tailgate has dropped down fully). In some embodiments, a limit switch, a proximity switch, an electrical contact, an optical switch, an optical proximity sensor, a magnetic proximity sensor, a position encoder, or any other suitable indicator provides an indication that an end of travel has been achieved. In some embodiments, the control circuitry monitors the current draw, torque, impedance, or other values corresponding to the actuator and de-activates the actuator based on the monitoring. For example, as the tailgate reaches an end of travel, the actuator may become more loaded as it actuates one or more linkages connected to the tailgate. Accordingly, the current draw increases and the control circuitry may detect the increase and deactivate the actuator (e.g., removes power from suitable pins of a relay to shut off power to the actuator). In some embodiments, the control circuitry deactivates the actuator at the end of travel, and correspondingly secures a latch (e.g., a cinch actuator) to lock the tailgate in position. An end of travel includes an intended stopping position (e.g., tailgate assembly fully dropped down), an intermediate position (e.g., based on a user input to stop by pressing a button, or a detent), any other suitable stopping position, or any combination thereof. For example, if the control circuitry detects a hindrance to rotation (e.g., a user is in the way, or some object is blocking the tailgate assembly, and actuator current increases), then the instant position may be determined to be the end of travel. In a further example, the control circuitry may detect an impact from a rotational position encoder (e.g., based on processing of the encoder signal) and accordingly determine the position of impact as the end of travel. In a further example, a cable, mechanical hard stop, or a detent may be used to more explicitly define the end of travel.

Step 918 includes control circuitry activating an actuator to rotate the tailgate up, based on a determination at step 910. In some embodiments, the control circuitry applies power to the actuator by applying voltage to suitable pins of a relay (e.g., applying 12 V across the control pins), wherein suitable pins of the relay (e.g., +12 V power and ground) are wired to the actuator. In some embodiments, the control circuitry generates a relatively low voltage and/or current control signal (e.g., 3.3 VDC, 5 VDC, 4-20 mA, a 5V pulse, or a 5 V PWM) to activate a relay (e.g., a mechanical relay, or a solid-state relay), a contactor, a transistor, any other suitable power electronics or components, or any combination thereof. In some embodiments, the control circuitry generates a signal that is based at least in part on the determined direction of step 910. For example, a relative polarity of two pins may change based on which direction the motion is to be in.

In some circumstances, control circuitry may determine not to perform step 918, step 920, or both. For example, if the tailgate assembly is already fully closed, then the control circuitry may determine not to perform step 918, step 920, or both (e.g., to prevent a damaging or dangerous configuration).

Step 920 includes control circuitry locking the tailgate assembly, in a closed position. In some embodiments, a limit switch, a proximity switch, an electrical contact, an optical switch, an optical proximity sensor, a magnetic proximity sensor, a position encoder, or any other suitable indicator provides an indication that the end of travel has been achieved, and the tailgate assembly may be locked in place. In some embodiments, the control circuitry activates a cinch actuator to lock the tailgate in position. In some embodiments, the control circuitry secures a latch to lock the tailgate assembly in place. In some circumstances, if the tailgate assembly is unable to close completely (e.g., something is blocking the rotation motion), the control circuitry need not perform step 920.

If the control circuitry determines to actuate the swing motion at step 908, the control circuitry may proceed to step 922 which includes control circuitry determining in which direction to cause a swinging motion (e.g., up or down). In some embodiments, the direction is indicated by which button is pressed (e.g., there are up and down buttons, position of a double throw toggle switch), which option is selected (e.g., a button on a key fob pressed by a user), or both. In some embodiments, the control circuitry determines the direction based on input received from a sensor. For example, if the tailgate is in a closed position as determined by a proximity switch, the control circuitry may determine to swing the tailgate down (e.g., to open the tailgate and provide access to a vehicle bed). In some embodiments, the control circuitry determines which direction to cause the swinging motion in based on the current state of the tailgate assembly. For example, the control circuitry may determine the current state to be that the tailgate is fully swung down based on a limit switch, and accordingly, the control circuitry may determine to cause a swing motion upwards (e.g., to close the tailgate against the vehicle).

Step 924 includes control circuitry releasing one or more second latches (or checking that one or more second latches are already released). In some embodiments, control circuitry sends a signal for one or more second latches to release. For example, the control circuitry may activate a relay to provide fused 12 V battery power to release a second latch. In a further example, the control circuitry may provide 12 V battery power to release a cinch actuator (e.g., thereby allowing the swinging motion). In some embodiments, the control circuitry also releases one or more third latches so that the tailgate is free to move (e.g., be actuated and undergo motion) relative to the vehicle.

Step 926 may include control circuitry activating an actuator to swing the tailgate down, based on a determination at step 922. In some embodiments, the control circuitry applies power to the actuator by applying voltage to suitable pins of a relay (e.g., applying 12 V across the control pins), wherein suitable pins of the relay (e.g., +12 V power and ground) are wired to the actuator. In some embodiments, the control circuitry generates a relatively low voltage and/or current control signal (e.g., 3.3 VDC, 5 VDC, 4-20 mA, a 5V pulse, or a 5 V PWM) to activate a relay (e.g., a mechanical relay, or a solid-state relay), a contactor, a transistor, any other suitable power electronics or components, or any combination thereof. In some embodiments, the control circuitry generates a signal that is based at least in part on the determined direction of step 922. For example, a relative polarity of two pins may change based on which direction the motion is to be in.

Step 928 includes control circuitry de-activating the actuator at an end of travel. In some embodiments, a limit switch, a proximity switch, an electrical contact, an optical switch, an optical proximity sensor, a magnetic proximity sensor, a position encoder, or any other suitable indicator provides an indication that an end of travel in the swing motion has been achieved. In some embodiments, the control circuitry monitors the current draw, torque, impedance, or other values corresponding to the actuator and de-activate the actuator based on the monitoring. For example, as the linkages reach an end of travel, the actuator may become more loaded as it actuates the tailgate. Accordingly, the current draw increases and the control circuitry may detect the increase and deactivate the actuator (e.g., removes power from suitable pins of a relay to shut off power to the actuator). In some embodiments, the control circuitry deactivates the actuator at the end of travel, and correspondingly activate a cinch actuator to lock the tailgate, at least one link, or at least one linkages, in place. An end of travel may include the intended stopping position (e.g., tailgate fully swung down), an intermediate position (e.g., based on a user input to stop by pressing a button), any other suitable stopping position, or any combination thereof. For example, if the control circuitry detects a hindrance to swinging (e.g., a user is in the way, or some object is stuck in the linkage, and actuator current increases), then the instant position may be determined to be the end of travel. In a further example, the control circuitry may detect an impact from a rotational position encoder coupled to a link and accordingly determine the position of impact as the end of travel. In a further example, a cable, mechanical hard stop, or a detent may be used to more explicitly define the end of travel.

In some embodiments, control circuitry determines not to perform step 924, step 926, or both. For example, if the tailgate assembly is already dropped down, then the control circuitry may determine not to perform step 924, step 926, or both (e.g., to prevent a damaging or dangerous configuration). In some embodiments, the control circuitry, for example, first suitably actuates the tailgate, or components thereof (e.g., a linkage), to a fully closed position before activating the actuator to swing the tailgate down.

Step 930 includes control circuitry activating an actuator to swing the tailgate up, based on a determination at step 922. In some embodiments, the control circuitry applies power to the actuator by applying voltage to suitable pins of a relay (e.g., applying 12 V across the control pins), wherein suitable pins of the relay (e.g., +12 V power and ground) are wired to the actuator. In some embodiments, the control circuitry generates a relatively low voltage and/or current control signal (e.g., 3.3 VDC, 5 VDC, 4-20 mA, a 5V pulse, or a 5 V PWM) to activate a relay (e.g., a mechanical relay, or a solid-state relay), a contactor, a transistor, any other suitable power electronics or components, or any combination thereof. In some embodiments, the control circuitry generates a signal that is based at least in part on the determined direction of step 922. For example, a relative polarity of two pins may change based on which direction the motion is to be in.

Step 932 includes control circuitry locking the tailgate. In some embodiments, a limit switch, a proximity switch, an electrical contact, an optical switch, an optical proximity sensor, a magnetic proximity sensor, a position encoder, or any other suitable indicator provides an indication that the end of travel has been achieved, and the tailgate may be locked in place. In some embodiments, the control circuitry activates a cinch actuator to lock the tailgate in position. In some circumstances, if the tailgate is unable to close completely (e.g., something is blocking the swinging motion), the control circuitry need not perform step 932.

In some embodiments, control circuitry determines not to perform step 930, step 932, or both. For example, if the tailgate is already locked against the vehicle, then the control circuitry may determine not to perform step 930, step 932, or both (e.g., to prevent a damaging or dangerous configuration).

It is contemplated that the steps or descriptions of FIG. 9 may be used with any other embodiments of this disclosure. In addition, the steps and descriptions described in relation to FIG. 9 may be done in alternative orders or in parallel to further the purposes of this disclosure. As another example, each of these steps may be performed in any suitable order or in parallel or substantially simultaneously to reduce lag or increase the speed of the system or method. Any of these steps may also be skipped or omitted from the process. In some embodiments, one or more steps may be performed by a user, and accordingly, need not be performed by control circuitry.

Figure 10:
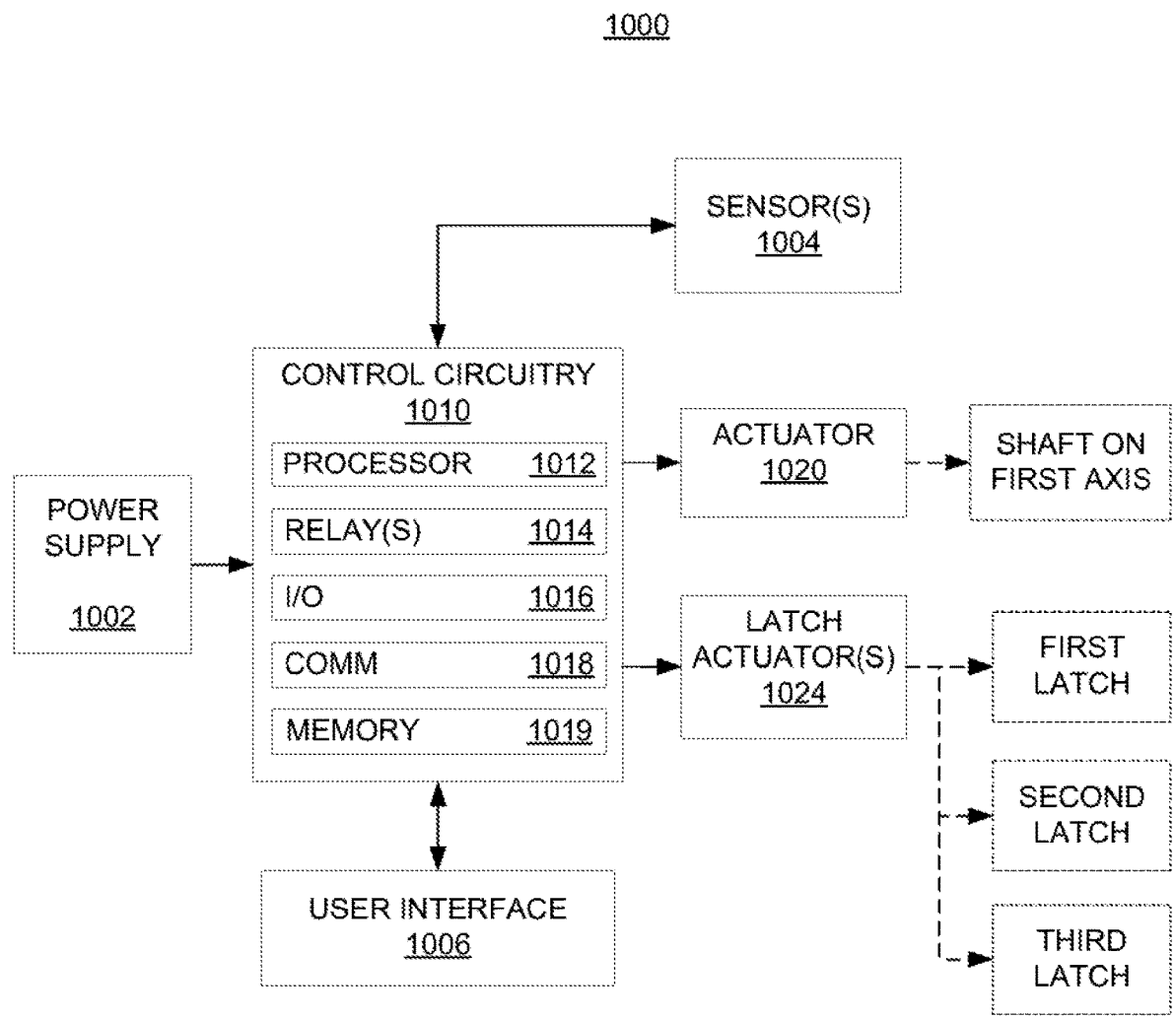
FIG. 10 shows a system diagram of an illustrative system including control circuitry, actuators, sensors, and a power supply, in accordance with some embodiments of the present disclosure.

FIG. 10 shows a system diagram of illustrative system 1000 including control circuitry 1010, actuator 1020, latch actuators 1024, sensors 1004, user interface 1006, and power supply 1002, in accordance with some embodiments of the present disclosure. Illustrative control circuitry 1010 includes processor 1012, one or more relays 1014 (hereinafter referred to as relay(s) 1014), input/output 1016 (hereinafter referred to as I/O 1016), communication hardware 1018 (hereinafter referred to as COMM 1018), and memory 1019.

Control circuitry 1010 may include hardware, software, or both, implemented on one or more modules configured to provide control of a tailgate assembly. In some embodiments, processor 1012 includes one or more microprocessors, microcontrollers, digital signal processors, programmable logic devices, field-programmable gate arrays (FPGAs), application-specific integrated circuits (ASICs), or any suitable combination thereof. In some embodiments, processor 1012 is distributed across more than one processor or processing units. In some embodiments, control circuitry 1010 executes instructions stored in memory for managing a dual motion tailgate. In some embodiments, memory 1019 is an electronic storage device that is part of control circuitry 1010. For example, memory may be configured to store electronic data, computer instructions, applications, firmware, or any other suitable information. In some embodiments, memory 1019 includes random-access memory, read-only memory, hard drives, optical drives, solid state devices, or any other suitable memory storage devices, or any combination thereof. For example, memory may be used to launch a start-up routine.

In some embodiments, control circuitry 1010 is powered by power supply 1002. In some embodiments, power supply 1002 includes a car battery (e.g., a 12 V lead acid battery), a DC-DC converter, an AC power supply (e.g., generated by suitably inverting a DC power supply), any other power supply, any corresponding components (e.g., terminals, switches, fuses, and cables), or any combination thereof. In some embodiments, power supply 1002 supplies power to actuator 1020, latch actuator(s) 1024, sensors 1004, user interface 1006, control circuitry 1010, any other suitable systems or components, or any combination thereof.

In some embodiments, user interface 1006 includes a push button, a toggle switch, a display screen (e.g., a touch screen), a key fob, a key-lock combination, any other suitable system or component for receiving input from a user or providing output to a user, or any combination thereof. In some embodiments, user interface 1006 includes a touchscreen on the dash of a vehicle, configured to receive input from user, and provide a display to the user. In some embodiments, user interface 1006 includes one or more buttons which are selectable by a user. For example, the one or more buttons may include a button coupled to a switch, a button on a touchpad, any other suitable button which may be used by a user to make a selection, or any combination thereof. In some embodiments, a key fob includes one or more buttons, which when pressed by a user, may provide an indication to COMM 1018 of control circuitry 1010. In some embodiments, user interface 1006 is implemented on a smartphone, tablet, or other portable device, which may communicate with control circuitry 1010 via COMM 1018. For example, a software application, or "app," may be implemented on a smartphone, with user-selectable options which may be communicated to COMM 1018 via a 3G network, WiFi, Bluetooth, or other suitable communication.

In some embodiments, sensor(s) 1004 include one or more proximity switches, limit switches, position sensors, current sensors, voltage sensors, torque sensors, haptic sensors, any other suitable sensors, or any combination thereof. For example, sensor(s) 1004 may include an optical encoder, a magnetic encoder, a potentiometer, or other suitable device for determining a rotary position or speed. In a further example, sensor(s) 1004 may include a current sensor configured to measure current provided to one or more actuators (e.g., actuator 1020, or latch actuator(s) 1024).

In some embodiments, actuator 1020 includes, or is accompanied by, a rotary actuator (e.g., an AC motor, or a DC motor), a linear actuator (e.g., an electric solenoid, hydraulic actuator, or a pneumatic actuator), a brake, a clutch, a transmission (e.g., geared or belt-driven), a counterweight, a rotation element (e.g., a torsion spring or damper), any other suitable hardware, or any combination thereof. For example, actuator 1020 may include a stepper motor, a servo motor, an induction motor, or other type of motor. In a further example, actuator 1020 may include a DC motor and a gear drive. In a further example, actuator 1020 may include a brake to generate friction to control motion.

In some embodiments, actuator 1020 is coupled to, or includes as part of itself, a shaft that is coupled to one or more links of a linkage coupling the tailgate to the vehicle (e.g., along a first rotational axis). For example, actuator 1020 may include one or more shafts, extending in one or more directions, connected rigidly to one or more links. In an illustrative example, actuator 1020 includes a shaft extending from two opposite ends, and coupled to respective links on either side of the tailgate (e.g., actuator 1020 is arranged between the links). In a further illustrative example, actuator 1020 includes a shaft extending from one end, and coupled to respective links on either side of the tailgate (e.g., actuator 1020 is arranged to one side of the tailgate in the side of the vehicle near a typical location of brake lights).

In some embodiments, latch actuator(s) 1024 include, or is accompanied by, a rotary actuator (e.g., an AC motor, or a DC motor), a linear actuator (e.g., an electric solenoid, hydraulic actuator, or a pneumatic actuator), a brake, a clutch, a transmission (e.g., geared or belt-driven), a lock, a latch, any other suitable hardware, or any combination thereof. In some embodiments, a plurality of latch actuator(s) 1024 may be included to, for example, secure both sides of a tailgate to a vehicle, cinch both sides of a tailgate to a vehicle, or both.

In some embodiments, for example, latch actuator(s) 1024 include one or more first latches (e.g., configured to secure and release a link of a four-bar linkage to the vehicle), one or more second latches (e.g., configured to secure and release the tailgate to a link of a four-bar linkage), and one or more third latches (e.g., to secure and release the tailgate from the vehicle).

Illustrative system 1000 of FIG. 10 may be used to perform any or all of the illustrative steps of process 900 of FIG. 9. Illustrative system 1000 of FIG. 10 may be used to control any of the tailgate assemblies shown in FIGS. 1-8, in accordance with the present disclosure. In some embodiments, not all components shown in FIG. 10 need be included in system 1000. For example, in some embodiments, no actuator 1020 is included and the tailgate is moved based on manual input (e.g., forces generated by a user). In a further example, in some embodiments, no latch actuator 1024 is included, and latches are secured and released manually by a user. In a further example, in some embodiments, user interface 1006 only includes electrical switches, and control circuitry 1010 only includes relays 1014, which provide power from power supply 1002 to actuator 1020, latch actuator(s) 1024, or both, based on positions of the electrical switches. In a further example, system 1000 need not include sensor(s) 1004. In some embodiments, a tailgate assembly operates completely under manual control, and system 1000 is not needed to achieve a swing motion or a drop motion.

The foregoing is merely illustrative of the principles of this disclosure and various modifications may be made by those skilled in the art without departing from the scope of this disclosure. The above described embodiments are presented for purposes of illustration and not of limitation. The present disclosure also can take many forms other than those explicitly described herein. Accordingly, it is emphasized that this disclosure is not limited to the explicitly disclosed methods, systems, and apparatuses, but is intended to include variations to and modifications thereof, which are within the spirit of the following claims.

What is claimed is:

1. A tailgate assembly comprising:
a tailgate;
a first link coupled to the tailgate and configured to be coupled to the vehicle at a first hinge having a first rotational axis;
a second link coupled to the tailgate and coupled to the vehicle at a second hinge having a second rotational axis parallel to the first rotational axis; and
a first latch configured to secure and release the first link to the vehicle at the first hinge, wherein:
when the first latch is secured, the first link is configured to rotate about the first hinge and the tailgate is configured to achieve a swinging motion, and
when the first latch is released, the first link is free to move away from the first hinge and the tailgate is configured to achieve a dropping motion.

2. The tailgate assembly of claim 1, wherein:
the first link is coupled to the tailgate at a third hinge on a third rotational axis parallel to the first rotational axis; and
the first link is configured to rotate relative to the tailgate about the third rotational axis.

3. The tailgate assembly of claim 2, wherein:
the second link is coupled to the tailgate at a fourth hinge on a fourth rotational axis parallel to the first rotational axis; and
the second link is configured to rotate relative to the tailgate about the fourth rotational axis.

4. The tailgate assembly of claim 3, wherein:
the tailgate comprises a first side, and a second side opposite to the first side;
the first link and the second link are coupled to the first side of the tailgate; and
the tailgate assembly further comprises:
a third link coupled to the tailgate on the second side, and configured to be coupled to the vehicle at a fifth hinge having a rotational axis coincident with the first rotational axis; and
a fourth link coupled to the tailgate on the second side and coupled to the vehicle at a sixth hinge having a rotational axis coincident with the second rotational axis.

5. The tailgate assembly of claim 3, wherein the swinging motion comprises:
a rotation of the first link about the first rotational axis relative to the vehicle;
a rotation of the first link about the third rotational axis relative to the tailgate;
a rotation of the second link about the second rotational axis relative to the vehicle; and
a rotation of the second link about the fourth rotational axis relative to the tailgate.

6. The tailgate assembly of claim 1, wherein the dropping motion comprises:
a rotation of the second link and tailgate about the second rotational axis relative to the vehicle.

7. The tailgate assembly of claim 6, further comprising a second latch configured to secure and release the tailgate and the second link to and from each other, wherein the tailgate is configured to achieve the dropping motion when the second latch is secured.

8. The tailgate assembly of claim 7, wherein the tailgate is configured to achieve the swinging motion when the first latch is secured and the second latch is released.

9. The tailgate assembly of claim 7, further comprising a third latch configured to secure and release the tailgate to and from the vehicle, wherein:
the tailgate is in a closed position when the third latch is secured;
the tailgate is configured to achieve a swinging motion when the first latch is secured, the second latch is released, and the third latch is released; and
the tailgate is configured to achieve a dropping motion when the first latch is released, the second latch is secured, and the third latch is released.

10. The tailgate assembly of claim 1, further comprising a shaft coupled to the second link, wherein the shaft is coincident with the second rotational axis.

11. The tailgate assembly of claim 10, wherein:
the shaft is configured to receive a torque from an electric motor; and
the shaft is configured to transmit the torque to the second link.

12. The tailgate assembly of claim 11, wherein:
the shaft comprises a first end; and
the electric motor is coupled to the first end of the shaft.

13. The tailgate assembly of claim 11, wherein:
the tailgate comprises a first side, and a second side opposite to the first side;
the first link and the second link are coupled to the first side of the tailgate; and
the tailgate assembly further comprises:
a third link coupled to the tailgate on the second side, and configured to be coupled to the vehicle at a fifth hinge having a rotational axis coincident with the first rotational axis;
a fourth link coupled to the tailgate on the second side and coupled to the vehicle at a sixth hinge having a rotational axis coincident with the second rotational axis, wherein:
the shaft is further coupled to the fourth link; and
the shaft is configured to receive the torque from the electric motor between the second link and the fourth link.

14. The tailgate assembly of claim 13, further comprising:
a second latch configured to secure and release the tailgate and the second link to and from each other; and
a third latch configured to secure and release the tailgate to and from the vehicle; wherein:
the tailgate is in a closed position when the third latch is secured;
the tailgate is configured to achieve a swinging motion when the first latch is secured, the second latch is released, and the third latch is released; and
the tailgate is configured to achieve a dropping motion when the first latch is released, the second latch is secured, and the third latch is released.

15. The tailgate assembly of claim 1, wherein the first rotational axis and the second rotational axis are substantially horizontal with respect the vehicle.

16. A vehicle comprising:
a vehicle bed having a rear end, and a side; and
a tailgate assembly arranged at the rear end of the vehicle bed, the tailgate assembly comprising:
a tailgate,
a four-bar linkage configured to connect the tailgate to the vehicle at the side of the vehicle, and
a latch configured to secure and release a first link of the four-bar linkage from the vehicle, wherein the tailgate is configured to achieve a dropping motion relative to the vehicle when the latch is released, and wherein the tailgate is configured to achieve a swinging motion relative to the vehicle when the latch is secured.

17. The vehicle of claim 16, further comprising:
an actuator coupled to the second link and configured to transmit torque to the second link;
a power supply configured to power the actuator; and
control circuitry configured to provide power to the actuator from the power supply to cause the tailgate to achieve the dropping motion and the swinging motion.

18. A method for controlling a tailgate assembly, wherein the tailgate assembly comprises:
a four-bar linkage configured to connect the tailgate to the vehicle at a first side of the vehicle;
a latch configured to secure and release a first link of the four-bar linkage from the vehicle; and
an actuator coupled to the second link of the four-bar linkage and configured to actuate the four-bar linkage, the method comprising:
receiving an indication to activate a swinging motion; and
in response to the indication:
actuating the actuator to cause the tailgate to achieve the swinging motion while the latch is secured.

19. The method of claim 18, further comprising:
receiving an indication to activate a dropping motion; and
in response to the indication to activate the dropping motion:
actuating the actuator to cause the tailgate to achieve the dropping motion while the latch is released.

\* \* \* \* \*